US010011734B2

(12) United States Patent
Sato et al.

(10) Patent No.: US 10,011,734 B2
(45) Date of Patent: Jul. 3, 2018

(54) COATED FILM

(71) Applicant: MITSUBISHI CHEMICAL CORPORATION, Tokyo (JP)

(72) Inventors: Takashi Sato, Maibara (JP); Taishi Kawasaki, Maibara (JP); Masato Fujita, Maibara (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 180 days.

(21) Appl. No.: 14/378,739

(22) PCT Filed: Jan. 24, 2013

(86) PCT No.: PCT/JP2013/051469
§ 371 (c)(1),
(2) Date: Aug. 14, 2014

(87) PCT Pub. No.: WO2013/125288
PCT Pub. Date: Aug. 29, 2013

(65) Prior Publication Data
US 2016/0032135 A1 Feb. 4, 2016

(30) Foreign Application Priority Data

Feb. 25, 2012 (JP) ................................. 2012-039433
Dec. 10, 2012 (JP) ................................. 2012-268897
Dec. 10, 2012 (JP) ................................. 2012-268898

(51) Int. Cl.
| C09D 133/04 | (2006.01) |
| C09D 133/06 | (2006.01) |
| C09D 133/08 | (2006.01) |
| C09D 133/10 | (2006.01) |
| C09D 133/14 | (2006.01) |
| C09D 163/06 | (2006.01) |
| C09D 161/28 | (2006.01) |
| C08L 33/04 | (2006.01) |
| C08L 33/06 | (2006.01) |
| C08L 33/08 | (2006.01) |
| C08L 33/10 | (2006.01) |

(Continued)

(52) U.S. Cl.
CPC ............ *C09D 133/08* (2013.01); *B32B 27/08* (2013.01); *B32B 27/36* (2013.01); *C08J 7/047* (2013.01); *B32B 7/02* (2013.01); *B32B 27/26* (2013.01); *B32B 27/30* (2013.01); *B32B 27/308* (2013.01); *B32B 2250/03* (2013.01); *B32B 2250/244* (2013.01); *B32B 2250/40* (2013.01); *B32B 2255/10* (2013.01); *B32B 2255/26* (2013.01); *B32B 2307/412* (2013.01); *B32B 2307/418* (2013.01); *B32B 2307/518* (2013.01); *B32B 2333/04* (2013.01); *B32B 2367/00* (2013.01); *B32B 2457/202* (2013.01); *B32B 2551/00* (2013.01); *C08J 2367/00* (2013.01); *C08J 2433/08* (2013.01); *C08J 2433/10* (2013.01); *C08K 3/013* (2018.01); *C08K 5/0025* (2013.01); *C08K 5/21* (2013.01); *C08K 5/29* (2013.01); *C08K 5/3415* (2013.01); *C08K 5/3492* (2013.01); *C08K 5/34922* (2013.01); *C08K 5/35* (2013.01); *C08K 5/353* (2013.01); *C08K 5/357* (2013.01); *C08L 33/04* (2013.01); *C08L 33/06* (2013.01); *C08L 33/08* (2013.01); *C08L 33/10* (2013.01); *C08L 33/14* (2013.01); *C08L 61/28* (2013.01); *C08L 63/06* (2013.01); *C09D 133/04* (2013.01); *C09D 133/06* (2013.01); *C09D 133/10* (2013.01); *C09D 133/14* (2013.01); *C09D 161/28* (2013.01); *C09D 163/06* (2013.01); *Y10T 428/263* (2015.01); *Y10T 428/31786* (2015.04)

(58) Field of Classification Search
None
See application file for complete search history.

(56) References Cited

U.S. PATENT DOCUMENTS 3,935,330 A * 1/1976 Smith .................. B05D 3/0209
427/487
4,273,632 A * 6/1981 Zarnegar .................. C09D 4/06
522/14

(Continued)

FOREIGN PATENT DOCUMENTS

| JP | 02-084445 | 3/1990 |
| JP | 2-84445 | 3/1990 |

(Continued)

OTHER PUBLICATIONS

Extended European Search Resort issued in App. No. 13752301.5 dated Sep. 21, 2015.

International Search Report for PCT/JP2013/051469 dated Apr. 9, 2013.

English language version of International Preliminary Report on Patentability in PCT/JP2013/051469 dated Sep. 4, 2014.

*Primary Examiner* — Vivian Chen
(74) *Attorney, Agent, or Firm* — Nixon & Vanderhye P.C.

(57) ABSTRACT

According to the present invention, there is provide a coated film capable of exhibiting an excellent adhesion property to a prism resin used in optical applications such as a backlight unit for liquid crystal displays, etc., in particular, a prism resin adaptable for high-brightness prisms, i.e., a high-refractive index prism resin. The coating film of the present invention comprises a polyester film and a coating layer formed on at least one surface of the polyester film which is prepared from a coating solution comprising a (meth)acrylate (A) and at least one crosslinking agent (B) selected from the group consisting of an oxazoline compound, an isocyanate-based compound and a melamine compound.

8 Claims, No Drawings

(51) Int. Cl.
| | |
|---|---|
| *C08L 33/14* | (2006.01) |
| *C08L 63/06* | (2006.01) |
| *C08L 61/28* | (2006.01) |
| *C08K 5/3492* | (2006.01) |
| *C08K 5/3415* | (2006.01) |
| *C08K 5/35* | (2006.01) |
| *C08K 5/353* | (2006.01) |
| *C08K 5/357* | (2006.01) |
| *C08K 5/29* | (2006.01) |
| *C08K 5/21* | (2006.01) |
| *C08K 3/013* | (2018.01) |
| *B32B 27/36* | (2006.01) |
| *B32B 27/26* | (2006.01) |
| *B32B 27/30* | (2006.01) |
| *B32B 27/08* | (2006.01) |
| *C08J 7/04* | (2006.01) |
| *C08K 5/00* | (2006.01) |
| *B32B 7/02* | (2006.01) |

(56) References Cited

U.S. PATENT DOCUMENTS

| | | | | |
|---|---|---|---|---|
| 4,352,723 | A * | 10/1982 | Morgan | C08F 22/105 430/300 |
| 4,377,457 | A * | 3/1983 | Boeckeler | C09D 161/20 522/100 |
| 4,425,207 | A * | 1/1984 | Boeckeler | C09D 161/20 522/100 |
| 5,009,949 | A * | 4/1991 | Tanaka | C08F 265/04 442/117 |
| 5,907,000 | A * | 5/1999 | Treadway | C08F 265/06 522/182 |
| 6,022,550 | A * | 2/2000 | Watanabe | C08F 291/00 424/402 |
| 6,335,832 | B1 * | 1/2002 | Oka | B29C 70/60 359/580 |
| 6,413,629 | B1 * | 7/2002 | Kimura | B32B 27/08 428/327 |
| 6,950,236 | B2 * | 9/2005 | Hokazono | G02B 1/111 359/586 |
| 7,235,591 | B2 * | 6/2007 | Tsunoda | C08F 290/061 522/104 |
| 7,371,439 | B2 * | 5/2008 | Matsunaga | B32B 27/08 428/1.3 |
| 7,473,462 | B2 * | 1/2009 | Coggio | C08F 14/18 428/212 |
| 7,517,584 | B2 | 4/2009 | Gust et al. | |
| 7,531,234 | B2 * | 5/2009 | Nakamura | G02B 1/105 428/323 |
| 8,754,180 | B2 * | 6/2014 | Suda | C08F 290/067 427/487 |
| 2002/0018886 | A1 * | 2/2002 | Matsufuji | C09D 4/00 428/328 |
| 2002/0110647 | A1 * | 8/2002 | Gust | B05D 3/12 427/558 |
| 2003/0036604 | A1 * | 2/2003 | Meisenburg | C08G 18/8175 525/123 |
| 2003/0068486 | A1 * | 4/2003 | Arney | C03C 17/007 428/323 |
| 2003/0157245 | A1 * | 8/2003 | Tatman | G02B 5/0841 427/162 |
| 2004/0071974 | A1 * | 4/2004 | Shoshi | C08J 7/047 428/421 |
| 2004/0071986 | A1 * | 4/2004 | Shoshi | C08F 283/00 428/446 |
| 2004/0081831 | A1 * | 4/2004 | Shoshi | C08J 7/047 428/422.8 |
| 2004/0151895 | A1 * | 8/2004 | Itoh | B32B 7/02 428/327 |
| 2004/0214980 | A1 * | 10/2004 | Pourreau | C08G 18/6216 528/85 |
| 2005/0123768 | A1 * | 6/2005 | Fischer | C08G 18/0819 428/413 |
| 2005/0142362 | A1 * | 6/2005 | Lnaoka Osamu | C08J 3/28 428/411.1 |
| 2005/0282945 | A1 * | 12/2005 | Faris | C09D 4/00 524/430 |
| 2006/0001040 | A1 * | 1/2006 | Kim | H01L 51/5256 257/100 |
| 2006/0116502 | A1 * | 6/2006 | Gurtler | C08G 18/673 528/44 |
| 2006/0147725 | A1 | 7/2006 | Gust et al. | |
| 2006/0165964 | A1 * | 7/2006 | Kato | B32B 27/08 428/212 |
| 2007/0048531 | A1 * | 3/2007 | Nagaoka | C08J 7/04 428/447 |
| 2007/0058250 | A1 * | 3/2007 | Muramatsu | G02B 1/105 359/493.01 |
| 2007/0070494 | A1 * | 3/2007 | Brott | G02B 5/287 359/357 |
| 2007/0146887 | A1 * | 6/2007 | Ikeda | G02B 1/111 359/586 |
| 2007/0195412 | A1 * | 8/2007 | Oya | B32B 7/02 359/487.05 |
| 2007/0224392 | A1 * | 9/2007 | Takeyama | C08J 7/18 428/141 |
| 2007/0259161 | A1 * | 11/2007 | Kato | G02B 1/105 428/212 |
| 2008/0032144 | A1 * | 2/2008 | Hashimoto | H05K 1/0326 428/480 |
| 2008/0050583 | A1 * | 2/2008 | Kubo | C08L 67/02 428/339 |
| 2008/0158675 | A1 * | 7/2008 | Fukushige | C08F 214/18 359/487.02 |
| 2008/0160300 | A1 * | 7/2008 | Hwang | B32B 7/12 428/345 |
| 2009/0004462 | A1 * | 1/2009 | Zhang | C08L 83/06 428/331 |
| 2010/0028600 | A1 * | 2/2010 | Kojima | B29C 55/026 428/141 |
| 2010/0028660 | A1 * | 2/2010 | Yeh | C08F 2/48 428/334 |
| 2010/0086743 | A1 * | 4/2010 | Wang | G02B 5/0221 428/172 |
| 2010/0119735 | A1 * | 5/2010 | Faler | B82Y 30/00 427/595 |
| 2010/0165603 | A1 * | 7/2010 | Sun | G02B 6/0053 362/97.2 |
| 2011/0008733 | A1 * | 1/2011 | Qiu | G03F 1/48 430/272.1 |
| 2011/0068305 | A1 * | 3/2011 | Yeh | C08F 2/48 252/582 |
| 2011/0143131 | A1 * | 6/2011 | Nomura | G02F 1/172 428/336 |
| 2011/0281037 | A1 * | 11/2011 | Lee | C09D 133/066 427/493 |
| 2012/0295040 | A1 * | 11/2012 | Kuki | C08G 18/6279 428/1.31 |
| 2012/0300306 | A1 * | 11/2012 | Nagahama | E06B 9/386 359/601 |
| 2013/0164541 | A1 * | 6/2013 | Suwa | C08F 290/067 428/412 |
| 2013/0309510 | A1 * | 11/2013 | Isogai | C09D 7/12 428/447 |

FOREIGN PATENT DOCUMENTS

| | | |
|---|---|---|
| JP | 02-158633 | 6/1990 |
| JP | 08-281890 | 10/1996 |
| JP | 09-176518 | 7/1997 |
| JP | 9-176518 | 7/1997 |
| JP | 11-286092 | 10/1999 |
| JP | 2000-229395 | 8/2000 |
| JP | 2006-205545 | 8/2006 |
| JP | 2007-254653 | 10/2007 |
| JP | 2008-063433 A * | 3/2008 |
| JP | 2008-524402 | 7/2008 |

(56) References Cited

FOREIGN PATENT DOCUMENTS

| | | |
|---|---|---|
| JP | 2008-208223 | 9/2008 |
| JP | 2010-013550 | 1/2010 |
| JP | 2010-066301 | 3/2010 |
| JP | 2010-253715 | 11/2010 |
| JP | 2010-253720 | 11/2010 |
| JP | 2011-011420 | 1/2011 |
| JP | 2011-126957 | 6/2011 |
| JP | 2013-45045 | 3/2013 |
| JP | 2013-045045 | 3/2013 |
| WO | WO 2006/069047 | 6/2006 |

* cited by examiner

COATED FILM

This application is the U.S. national phase of International Application No. PCT/JP2013/51469 filed 24 Jan. 2013 which designated the U.S. and claims priority to JP 2012-039433 filed 25 Feb. 2012, JP 2012-268897 filed 10 Dec. 2012, and JP 2012-268898 filed 10 Dec. 2012; the entire contents of each of which are hereby incorporated by reference.

TECHNICAL FIELD

The present invention relates to a coated film, and more particularly, to a coated film that is suitably used as a member for a prism sheet or a microlens used in a backlight unit of liquid crystal displays, etc., and has a good adhesion property to various surface functional layers.

BACKGROUND ART

In recent years, liquid crystal displays have been extensively used as a display device for TVs, personal computers, digital cameras, cellular phones, etc. The liquid crystal displays have no light-emitting function by themselves. Therefore, liquid crystal displays of the type in which light is irradiated from a backside thereof using a backlight have now come to dominate.

As the backlight type liquid crystal displays, there are known those having a so-called edge light type structure or a so-called direct backlight type structure. With the recent tendency toward reduction in thickness of liquid crystal displays, the edge light type liquid crystal displays have been more frequently employed. The edge light type liquid crystal displays are generally constructed of a reflection sheet, a light guide plate, a light diffusion sheet and a prism sheet which are successively laminated in this order. The flow of light through such edge light type liquid crystal displays is designed such that the light entered from the backlight into the light guide plate is reflected on the reflection sheet and then emitted from the surface of the light guide plate. The light emitted from the light guide plate is entered into the light diffusion sheet, diffused therein and then emitted therefrom. The light emitted from the light diffusion sheet is then entered into the prism sheet disposed next to the light diffusion sheet. In the prism sheet, the light entered thereinto is converged in the normal direction and emitted therefrom toward the liquid crystal layer.

The prism sheet used in the above construction serves for improving an optical efficiency of the backlight and enhancing a brightness thereof. As a transparent base film for the prism sheet, there has been generally used a polyester film in view of a transparency and mechanical properties thereof. In general, an easy-bonding coating layer may be further provided as an intermediate layer between the polyester film as the base material and the prism layer in order to enhance adhesion therebetween. It is known that the easy-bonding coating layer is formed of, for example, a polyester resin, an acrylic resin or a polyurethane resin (Patent Documents 1 to 3).

The prism layer may be produced, for example, by the following method. That is, an active energy ray-curable coating material is charged into a prism mold, and then a polyester film is placed on the coating material thus charged so as to interpose the coating material between the polyester film and the mold. Next, an active energy ray is irradiated to the active energy ray-curable coating material to cure the resin, and then the mold is removed from the cured resin, thereby obtaining the prism layer formed on the polyester film. In such a method, in order to form an accurate prism pattern on the prism layer, it is required to use a solvent-free type active energy ray-curable resin. However, the solvent-free type resin tends to be deteriorated in penetration into an easy-bonding layer laminated on the polyester film and swelling effect therein as compared to a solvent type resin and, therefore, tends to be insufficient in adhesion to the polyester film. In order to improve the adhesion property, a coating layer comprising a specific polyurethane resin has been proposed. However, even such a coating layer may still fail to exhibit a sufficient adhesion property to the solvent-free type resin (Patent Document 4).

In order to improve an adhesion property to the solvent-free type resin, there has been proposed a coating layer comprising a polyurethane resin and an oxazoline compound as main components (Patent Document 5). However, the conventionally proposed coating layer tends to be still insufficient in adhesion property to a prism layer being adaptable for high-brightness prisms that can meet the current requirements such as reduction in number of backlight elements and suppression of a power consumption therefor, i.e., a high-refractive index prism layer.

CITATION LIST

Patent Literature

Patent Document 1: Japanese Patent Application Laid-Open (KOKAI) No. 8-281890
Patent Document 2: Japanese Patent Application Laid-Open (KOKAI) No. 11-286092
Patent Document 3: Japanese Patent Application Laid-Open (KOKAI) No. 2000-229395
Patent Document 4: Japanese Patent Application Laid-Open (KOKAI) No. 2-158633
Patent Document 5: Japanese Patent Application Laid-Open (KOKAI) No. 2010-13550

SUMMARY OF THE INVENTION

Problems to be Solved by the Invention

The present invention has been accomplished in view of the above conventional problems. An object of the present invention is to provide a coated film that can exhibit a good adhesion property to various solvent-free type resins, and can be suitably used, for example, as a member for a prism sheet or a microlens employed in a backlight unit for liquid crystal displays, etc.

Means for Solving Problems

As a result of the present inventors' earnest study in view of the above problems, it has been found that the above problems can be readily solved by using a coated film having a specific structure. The present invention has been attained on the basis of this finding.

That is, in an aspect of the present invention, there is provided a coated film comprising a polyester film and a coating layer formed on at least one surface of the polyester film which is prepared from a coating solution comprising a (meth)acrylate (A) and at least one crosslinking agent (B) selected from the group consisting of an oxazoline compound, an isocyanate-based compound and a melamine compound.

Effect of the Invention

In accordance with the present invention, it is possible to provide a coated film having an excellent adhesion property to various prism layers and microlens layers. Therefore, the present invention has a high industrial value.

EMBODIMENTS FOR CARRYING OUT THE INVENTION

The polyester film constituting the coated film of the present invention may have either a single layer structure or a multilayer structure. Unless departing from the scope of the present invention, the polyester film may have not only a two or three layer structure but also a four or more multilayer structure, and the layer structure of the polyester film is not particularly limited.

The polyester used in the present invention may be either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate or the like. On the other hand, as a dicarboxylic acid component of the copolyester, there may be mentioned one or more compounds selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the copolyester, there may be mentioned one or more compounds selected from the group consisting of ethylene glycol, diethylene glycol, propylene glycol, butanediol, 4-cyclohexanedimethanol and neopentyl glycol.

The polymerization catalyst for production of the polyester is not particularly limited, and any conventionally known catalysts may be used as the polymerization catalyst. Examples of the polymerization catalyst include a titanium compound, a germanium compound, an antimony compound, a manganese compound, an aluminum compound, a magnesium compound and a calcium compound. Of these compounds, the titanium compound and the germanium compound are preferably used because they exhibit a high catalytic activity and are capable of effectively conducting polymerization even when used in a small amount, and can also provide a film having a high brightness owing to a less amount of these metals remaining in the film. Further, the titanium compound is more preferably used because the germanium compound is expensive.

The polyester film used in the present invention may also comprise an ultraviolet absorber in order to improve a weathering resistance of the film and prevent deterioration of liquid crystals and the like. The ultraviolet absorber is not particularly limited as long as it is a compound that is capable of absorbing an ultraviolet ray and can withstand heat applied during a process for producing the polyester film.

As the ultraviolet absorber, there are generally known an organic ultraviolet absorber and an inorganic ultraviolet absorber. In view of a good transparency of the resulting film, among these ultraviolet absorbers, the organic ultraviolet absorber is preferably used. Examples of the organic ultraviolet absorber include, but are not particularly limited to, cyclic iminoester-based ultraviolet absorbers, benzotriazole-based ultraviolet absorbers and benzophenone-based ultraviolet absorbers. Among these organic ultraviolet absorbers, cyclic iminoester-based ultraviolet absorbers and benzotriazole-based ultraviolet absorbers are preferred in view of a good durability. These ultraviolet absorbers may be used in combination of any two or more thereof.

For the main purposes of imparting an easy-slipping property to the film and preventing occurrence of flaws in the film in the respective steps, particles may be blended in the polyester layer. The kind of particles to be blended in the polyester film is not particularly limited, and any particles may be used as long as the particles are capable of imparting a good easy-slipping property to the film. Specific examples of the particles include inorganic particles such as silica, calcium carbonate, magnesium carbonate, barium carbonate, calcium sulfate, calcium phosphate, magnesium phosphate, kaolin, aluminum oxide and titanium oxide, and organic particles such as acrylic reins, styrene resins, urea resins, phenol resins, epoxy resins and benzoguanamine resins, etc. Further, there may also be used deposited particles obtained by precipitating and finely dispersing a part of metal compounds such as a catalyst during the process for production of the polyester.

The shape of the particles used in the polyester film is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

The average particle diameter of the above particles is usually in the range of not more than 5 µm and preferably 0.01 to 3 µm. When the average particle diameter of the particles is more than 5 µm, the obtained film tends to have an excessively coarse surface roughness, thereby causing problems in the subsequent steps upon forming a surface functional layer or the like on the polyester film.

The content of the particles in the polyester layer is usually in the range of not more than 5% by weight and preferably 0.0003 to 3% by weight. When the polyester layer comprises no particles or a less amount of the particles, although the resulting film has a high transparency and therefore provides a good film, the film tends to be insufficient in slipping property. Therefore, in such a case, it is required to take a measure for enhancing a slipping property, for example, by incorporating particles in a coating layer formed thereon, etc. On the other hand, when the content of the particles in the polyester layer is more than 5% by weight, the resulting film tends to be insufficient in transparency.

The method of adding the particles to the polyester layer is not particularly limited, and any conventionally known methods can be suitably used therefor. For example, the particles may be added at any optional stages in the process for production of the polyester forming the respective layers. The particles are preferably added to the polyester after completion of the esterification reaction or transesterification reaction.

Meanwhile, the above polyester film used in the present invention may also comprise, in addition to the above particles and ultraviolet absorbers, known additives such as an antioxidant, an antistatic agent, a thermal stabilizer, a lubricant, a dye, a pigment, etc., if required.

The thickness of the polyester film used in the present invention is not particularly limited, and the polyester film may have any thickness as long as it can be produced while maintaining a suitable film shape. The thickness of the polyester film is usually in the range of 10 to 350 µm and preferably 25 to 300 µm.

Next, an example of the process of producing the polyester film used in the present invention is more specifically explained, although the present invention is not particularly limited thereto. That is, there may be adopted such a process in which pellets obtained by drying the above-mentioned raw polyester material are extruded from a die using a single-screw extruder in the form of a molten sheet, and the molten sheet is then cooled and solidified on a chilled roll to obtain an undrawn sheet. In this case, in order to enhance a flatness of the obtained sheet, it is preferred to enhance adhesion between the sheet and the rotary chilled drum. For this purpose, an electrostatic pinning method or a liquid coating adhesion method is preferably used. Next, the thus obtained undrawn sheet is biaxially drawn. In such a case, the undrawn sheet is first drawn in one direction thereof using a roll-type or tenter-type drawing machine. The drawing temperature is usually 70 to 120° C. and preferably 80 to 110° C., and the draw ratio is usually 2.5 to 7 times and preferably 3.0 to 6 times. Next, the thus drawn film is further drawn in the direction perpendicular to the drawing direction of the first stage. In this case, the drawing temperature is usually 70 to 170° C., and the draw ratio is usually 3.0 to 7 times and preferably 3.5 to 6 times. Successively, the resulting biaxially drawn sheet is heat-set at a temperature of 180 to 270° C. under a tension or under relaxation within 30% to obtain a biaxially oriented film. Upon the above drawing steps, there may also be used the method in which the drawing in each direction is carried out in two or more stages. In such a case, the multi-stage drawing is preferably performed such that the draw ratio in each of the two directions finally falls within the above-specified range.

Also, upon producing the polyester film, there may also be used a simultaneous biaxial drawing method. The simultaneous biaxial drawing method is such a method in which the above undrawn sheet is drawn and oriented in both of the machine and width directions at the same time while maintaining the sheet in a suitable temperature-controlled condition at a temperature of usually 70 to 120° C. and preferably 80 to 110° C. The draw ratio used in the simultaneous biaxial drawing method is 4 to 50 times, preferably 7 to 35 times and more preferably 10 to 25 times in terms of an area ratio of the sheet to be drawn. Successively, the obtained biaxially drawn sheet is heat-set at a temperature of 170 to 250° C. under a tension or under relaxation within 30% to obtain a drawn oriented film. As the apparatus used in the above simultaneous biaxial drawing method, there may be employed any conventionally known drawing apparatuses such as a screw type drawing apparatus, a pantograph type drawing apparatus and a linear drive type drawing apparatus.

Next, the method of forming the coating layer constituting the coated film of the present invention is explained. The coating layer may be formed either by an in-line coating method in which the surface of the polyester film is subjected to coating treatment during the film-forming step of the polyester film, or by an off-line coating method in which the polyester film produced is once transferred to an outside of the film production system and subjected to coating treatment. Among these methods, the in-line coating method is preferably used because the coating layer can be produced simultaneously with formation of the polyester film and therefore at low costs.

For example, in the case of a sequential biaxial drawing process, the in-line coating treatment may be carried out, in particular, after completion of the longitudinal drawing but before initiation of the lateral drawing, although the present invention is not particularly limited thereto. When the coating layer is formed on the polyester film by the in-line coating method, the coating can be carried out simultaneously with formation of the polyester film, and the coating layer can be treated at a high temperature when subjecting the drawn polyester film to the heat-setting step, so that the resulting coated film can be enhanced in performances such as an adhesion property to various functional layers to be formed on the coating layer as well as a wet heat resistance of the resulting film, etc. Also, when the coating step is conducted before drawing the polyester film, the thickness of the coating layer may be changed by adjusting a draw ratio of the film, so that the thin-film coating step can be more easily conducted as compared to the off-line coating method. Thus, by using the in-line coating method, in particular, by conducting the in-line coating method before the drawing, it is possible to produce a film suitable as the polyester film used in the present invention.

In the present invention, it is essentially required that the coating layer is prepared from a coating solution comprising a (meth)acrylate (A) and at least one crosslinking agent (B) selected from the group consisting of an oxazoline compound, an isocyanate-based compound and a melamine compound. Meanwhile, the expression "(meth)acrylate" as used in the present specification represents both of "an acrylate and a methacrylate".

The coating layer formed in the present invention is capable of improving, in particular, an adhesion property to a solvent-free type active energy ray-curable layer, for example, to form a prism layer or a microlens layer. In particular, the coating layer can be adapted for enhancing an adhesion property to a high-refractive index prism layer or microlens layer which aims at providing a high-brightness prism and tends to be deteriorated in adhesion to the coating layer.

The mechanism for enhancing the adhesion property is estimated as follow. That is, by irradiating an ultraviolet ray upon forming the prism layer or microlens layer, a carbon-carbon double bond in a methacrylate ($CH_2$=CH—COO—R or $CH_2$=$C(CH_3)$—COO—R) contained in the coating layer is reacted with a carbon-carbon double bond in a compound used for forming the prism layer or microlens layer to form a covalent bond therebetween.

As the materials for providing the carbon-carbon double bond in the (meth)acrylate, conventionally known materials may be used without any particular limitation as long as they are capable of reacting with a carbon-carbon double bond contained in the compound forming the prism layer or microlens layer. Examples of the materials include monofunctional (meth)acrylates, bifunctional (meth)acrylates and polyfunctional (meth)acrylates.

The monofunctional (meth)acrylates are not particularly limited. Examples of the monofunctional (meth)acrylates include alkyl(meth)acrylates such as methyl(meth)acrylate, n-butyl(meth)acrylate, 2-ethylhexyl(meth)acrylate, lauryl (meth)acrylate, stearyl(meth)acrylate, cyclohexyl(meth) acrylate and isobornyl(meth)acrylate; hydroxyalkyl(meth) acrylates such as hydroxyethyl(meth)acrylate, hydroxypropyl(meth)acrylate and hydroxybutyl(meth)acrylate; alkoxyalkyl(meth)acrylates such as methoxyethyl (meth)acrylate, ethoxyethyl(meth)acrylate, methoxypropyl (meth)acrylate and ethoxypropyl(meth)acrylate; aromatic (meth)acrylates such as benzyl(meth)acrylate and phenoxyethyl(meth)acrylate; amino group-containing (meth)acrylates such as diaminoethyl(meth)acrylate and diethylaminoethyl(meth)acrylate; ethyleneoxide-modified (meth) acrylates such as methoxyethylene glycol (meth)acrylate, phenoxypolyethylene glycol (meth)acrylate and phenyl phenol ethyleneoxide-modified (meth)acrylate; and glycidyl (meth)acrylate, tetrahydrofurfuryl(meth)acrylate and (meth) acrylic acid.

The bifunctional (meth)acrylates are not particularly limited. Examples of the bifunctional (meth)acrylates include alkanediol di(meth)acrylates such as 1,4-butanediol di(meth)acrylate, neopentyl glycol di(meth)acrylate, 1,6-hexanediol di(meth)acrylate, 1,9-nonanediol di(meth)acrylate and tricyclodecanedimethanol di(meth)acrylate; bisphenol-modified di(meth)acrylates such as bisphenol A ethyleneoxide-modified di(meth)acrylate and bisphenol F ethyleneoxide-modified di(meth)acrylate; and polyethylene glycol di(meth)acrylate, polypropylene glycol di(meth)acrylate, urethane di(meth)acrylate and epoxy di(meth)acrylate.

The polyfunctional (meth)acrylates are not particularly limited. Examples of the polyfunctional (meth)acrylates include dipentaerythritol hexa(meth)acrylate, pentaerythritol tetra(meth)acrylate, ditrimethylol propane tetra(meth)acrylate, pentaerythritol tri(meth)acrylate, trimethylol propane tri(meth)acrylate, tetramethylol methane ethyleneoxide-modified tetra(meth)acrylate, isocyanuric acid-modified tri(meth)acrylates such as isocyanuric acid ethyleneoxide-modified tri(meth)acrylate and ε-caprolactone-modified tris(acryloxyethyl)isocyanurate, and urethane acrylates such as a pentaerythritol triacrylate hexamethylene diisocyanate urethane prepolymer, a pentaerythritol triacrylate toluene diisocyanate urethane prepolymer and a dipentaerythritol pentaacrylate hexamethylene diisocyanate urethane prepolymer.

These compounds may be used alone or in the form of a mixture of any two or more thereof. Of these compounds, from the standpoint of improving an adhesion property of the coating layer, preferred are bifunctional (meth)acrylates and polyfunctional (meth)acrylates, and more preferred are polyfunctional (meth)acrylates. In addition, there may also be used multi-branched (meth)acryloyl group-containing polymers (such as, e.g., hyper-branched polymers, dendrimers and starburst polymers). Examples of commercially available products of these multi-branched polymers include "BISCOAT" series (such as "BISCOAT #1000", etc.) as products produced by Osaka Organic Chemical Industry Ltd.

The proportion of the carbon-carbon double bond moiety in the (meth)acrylates is usually in the range of not less than 3% by weight and preferably not less than 5% by weight in view of a good adhesion property to the prism layer or microlens layer, in particular, a good adhesion property to a resin having a high refractive index. The upper limit of the proportion of the carbon-carbon double bond moiety in the (meth)acrylates is usually 40% by weight.

The oxazoline compound, isocyanate-based compound and melamine compound used for forming the coating layer in the present invention serve for enhancing an adhesion property thereof and increasing a strength of the resulting coating film. Among these compounds, from the standpoint of enhancing an adhesion property of the coating layer, preferred are the oxazoline compound and the isocyanate-based compound.

The oxazoline compounds are those compounds having an oxazoline group in a molecule thereof. Of these compounds, especially preferred are polymers having an oxazoline group which may be in the form of a homopolymer of an addition-polymerizable oxazoline group-containing monomer or a copolymer of the addition-polymerizable oxazoline group-containing monomer with the other monomer. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. These oxazoline compounds may be used alone or in the form of a mixture of any two or more thereof. Among these oxazoline compounds, 2-isopropenyl-2-oxazoline is more preferred because of good industrial availability thereof. The other monomers used in the copolymer are not particularly limited as long as they are monomers that are copolymerizable with the addition-polymerizable oxazoline group-containing monomer. Examples of the other monomers include (meth)acrylic acid esters such as alkyl(meth)acrylates (in which the alkyl group may be methyl, ethyl, n-propyl, isopropyl, n-butyl, isobutyl, t-butyl, 2-ethylhexyl, cyclohexyl or the like); unsaturated carboxylic acids such as acrylic acid, methacrylic acid, itaconic acid, maleic acid, fumaric acid, crotonic acid, styrenesulfonic acid and salts thereof (such as sodium salts, potassium salts, ammonium salts and tertiary amine salts); unsaturated nitriles such as acrylonitrile and methacrylonitrile; unsaturated amides such as (meth)acrylamide, N-alkyl(meth)acrylamides and N,N-dialkyl(meth)acrylamides (in which the alkyl group may be methyl, ethyl, n-propyl, isopropyl, n-butyl, isobutyl, t-butyl, 2-ethylhexyl, cyclohexyl or the like); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene. These other monomers may be used alone or in combination of any two or more thereof.

The isocyanate-based compound means an isocyanate or a compound having an isocyanate derivative structure such as typically a blocked isocyanate. Examples of the isocyanate include aromatic isocyanates such as tolylene diisocyanate, xylylene diisocyanate, methylene diphenyl diisocyanate, phenylene diisocyanate and naphthalene diisocyanate; aromatic ring-containing aliphatic isocyanates such as α,α, α',α'-tetramethyl xylylene diisocyanate; aliphatic isocyanates such as methylene diisocyanate, propylene diisocyanate, lysine diisocyanate, trimethyl hexamethylene diisocyanate and hexamethylene diisocyanate; and alicyclic isocyanates such as cyclohexane diisocyanate, methyl cyclohexane diisocyanate, isophorone diisocyanate, methylene-bis(4-cyclohexyl isocyanate) and isopropylidene dicyclohexyl diisocyanate. Further examples of the isocyanate include polymers and derivatives of these isocyanates such as biuret compounds, isocyanurate compounds, uretdione compounds and carbodiimide-modified compounds of these isocyanates. These isocyanates may be used alone or in combination of any two or more thereof. Among these isocyanates, from the viewpoint of preventing occurrence of yellowing owing to ultraviolet radiation, aliphatic isocyanates and alicyclic isocyanates are more suitably used as compared to aromatic isocyanates.

When the isocyanate compound is used in the form of a blocked isocyanate, examples of blocking agents used for production thereof include bisulfites; phenol-based compounds such as phenol, cresol and ethyl phenol; alcohol-based compounds such as propylene glycol monomethyl ether, ethylene glycol, benzyl alcohol, methanol and ethanol; active methylene-based compounds such as dimethyl malonate, diethyl malonate, methyl acetoacetate, ethyl acetoacetate and acetyl acetone; mercaptan-based compounds such as butyl mercaptan and dodecyl mercaptan; lactam-based compounds such as ε-caprolactam and δ-valerolactam; amine-based compounds such as diphenyl aniline, aniline and ethylene imine; acid amide compounds such as acetanilide and acetic acid amide; and oxime-based compounds such as formaldehyde, acetaldoxime, acetone oxime, methyl ethyl ketone oxime and cyclohexanone oxime. These blocking agents may be used alone or in combination of any two or more thereof.

The melamine compounds are compounds having a melamine skeleton therein. Examples of the melamine compounds include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a dimer or higher polymer, or may be in the form of a mixture thereof. In addition, there may also be used those compounds obtained by co-condensing a urea or the like to a part of melamine. Further, a catalyst may also be used to enhance a reactivity of the melamine compound.

Upon forming the coating layer, in order to improve a coating appearance of the obtained layer and enhance a transparency and an adhesion property thereof, various polymers may be used in combination with each other.

Specific examples of the various polymers include polyurethane resins, polyester resins, acrylic resins, polyvinyl compounds (such as polyvinyl alcohol), polyalkylene glycols, polyalkylene imines, methyl cellulose, hydroxy cellulose, starches, etc. Among these polymers, in view of enhancing an adhesion property of the coating layer, preferred are polyurethane resins, polyester resins and acrylic resins.

The polyurethane resin means a polymer compound having an urethane bond in a molecule thereof and is usually produced by the reaction between a polyol and an isocyanate. Examples of the polyol include polyester polyols, polycarbonate polyols, polyether polyols, polyolefin polyols and acrylic polyols. These compounds may be used alone or in combination of any two or more thereof.

Examples of the polyester polyols include those compounds produced by reacting a polycarboxylic acid (such as malonic acid, succinic acid, glutaric acid, adipic acid, pimelic acid, suberic acid, sebacic acid, fumaric acid, maleic acid, terephthalic acid and isophthalic acid) or an acid anhydride thereof with a polyhydric alcohol (such as ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyl dialkanol amines and lactonediol), as well as those compounds having a derivative unit of a lactone compound such as polycaprolactone.

The polycarbonate polyols may be obtained by subjecting a polyhydric alcohol and a carbonate compound to dealcoholization reaction. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexane dimethanol, 1,7-heptanediol, 1,8-octanediol, 1,9-nonanediol, 1,10-decanediol, neopentyl glycol, 3-methyl-1,5-pentanediol and 3,3-dimethylol heptane. Examples of the carbonate compound include dimethyl carbonate, diethyl carbonate, diphenyl carbonate and ethylene carbonate. Examples of the polycarbonate polyols obtained by the reaction between the above compounds include poly(1,6-hexylene)carbonate and poly(3-methyl-1,5-pentylene)carbonate.

Examples of the polyether polyols include polyethylene glycol, polypropylene glycol, polyethylene/propylene glycol, polytetramethylene ether glycol and polyhexamethylene ether glycol.

In order to enhance adhesion to various overcoat layers, among the above polyols, preferred are polyester polyols and polycarbonate polyols.

Examples of a polyisocyanate compound used for producing the polyurethane resin include aromatic diisocyanates such as tolylene diisocyanate, xylylene diisocyanate, methylene diphenyl diisocyanate, phenylene diisocyanate, naphthalene diisocyanate and tolidine diisocyanate; aromatic ring-containing aliphatic diisocyanates such as α,α,α',α'-tetramethyl xylylene diisocyanate; aliphatic diisocyanates such as methylene diisocyanate, propylene diisocyanate, lysine diisocyanate, trimethyl hexamethylene diisocyanate and hexamethylene diisocyanate; and alicyclic diisocyanates such as cyclohexane diisocyanate, methyl cyclohexane diisocyanate, isophorone diisocyanate, dicyclohexylmethane diisocyanate and isopropylidene dicyclohexyl diisocyanate. These polyisocyanate compounds may be used alone or in combination of any two or more thereof. These polyisocyanate compounds may be in the form of a dimer, a trimer such as typically an isocyanuric ring, or a tetramer or higher polymer.

When the polyurethane resin is synthesized, there may be used a chain extender. The chain extender is not particularly limited, and any chain extender may be used as long as it has two or more active groups capable of reacting with an isocyanate group. In general, there may be mainly used such a chain extender having two hydroxyl groups or two amino groups.

Examples of the chain extender having two hydroxyl groups include glycols, e.g., aliphatic glycols such as ethylene glycol, propylene glycol and butanediol; aromatic glycols such as xylylene glycol and bishydroxyethoxybenzene; and ester glycols such as neopentyl glycol hydroxypivalate. Examples of the chain extender having two amino groups include aromatic diamines such as tolylenediamine, xylylenediamine and diphenylmethanediamine; aliphatic diamines such as ethylenediamine, propylenediamine, hexanediamine, 2,2-dimethyl-1,3-propanediamine, 2-methyl-1,5-pentanediamine, trimethyl hexanediamine, 2-butyl-2-ethyl-1,5-pentanediamine, 1,8-octanediamine, 1,9-nonanediamine and 1,10-decanediamine; and alicyclic diamines such as 1-amino-3-aminomethyl-3,5,5-trimethyl cyclohexane, dicyclohexylmethanediamine, isopropylidenecyclohexyl-4,4'-diamine, 1,4-diaminocyclohexane and 1,3-bisaminomethyl cyclohexane.

The polyester resins may be those polyester resins produced, for example, from the following polycarboxylic acids and polyhydroxy compounds as main constituents. More specifically, as the polycarboxylic acids, there may be used terephthalic acid, isophthalic acid, orthophthalic acid, phthalic acid, 4,4'-diphenyldicarboxylic acid, 2,5-naphthalenedicarboxylic acid, 1,5-naphthalenedicarboxylic acid, 2,6-naphthalenedicarboxylic acid, 2,7-naphthalenedicarboxylic acid, 1,4-cyclohexanedicarboxylic acid, 2-potassium sulfo-terephthalic acid, 5-sodium sulfo-isophthalic acid, adipic acid, azelaic acid, sebacic acid, dodecanedicarboxylic acid, glutaric acid, succinic acid, trimellitic acid, trimesic acid, pyromellitic acid, trimellitic anhydride, phthalic anhydride, p-hydroxybenzoic acid, trimellitic acid monopotassium salt and ester-forming derivatives thereof. Examples of the polyhydroxy compounds include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexane dimethanol, p-xylylene glycol, an adduct of bisphenol A with ethylene glycol, diethylene glycol, triethylene glycol, polyethylene glycol, polypropylene glycol, polytetramethylene glycol, polytetramethyleneoxide glycol, dimethylol propionic acid, glycerin, trimethylol propane, sodium dimethylol ethyl sulfonate and potassium dimethylol propionate. The polyester resins may be synthesized by subjecting one or more compounds appropriately selected from the respective groups of the aforementioned compounds to polycondensation reaction by an ordinary method.

The acrylic resin used in the present invention is in the form of a polymer obtained from a polymerizable monomer having a carbon-carbon double bond such as, typically, an acrylic monomer and a methacrylic monomer. The polymer may be either a homopolymer or a copolymer. The polymer may also include a copolymer of the polymer with the other polymer (such as, for example, a polyester and a polyurethane). Examples of the copolymer include a block copolymer and a graft copolymer. In addition, the polymer may also include a polymer obtained by polymerizing the polymerizable monomer having a carbon-carbon double bond in a polyester solution or a polyester dispersion (which may also be in the form of a mixture of the polymers). Further, the polymer may also include a polymer obtained by polymerizing the polymerizable monomer having a carbon-carbon double bond in a polyurethane solution or a polyurethane dispersion (which may also be in the form of a mixture of the polymers). Similarly, the polymer may also include a polymer obtained by polymerizing the polymerizable monomer having a carbon-carbon double bond in the other polymer solution or the other polymer dispersion (which may also be in the form of a mixture of the polymers).

The above polymerizable monomer having a carbon-carbon double bond is not particularly limited. Examples of the typical compounds as the polymerizable monomer include various carboxyl group-containing monomers such as acrylic acid, methacrylic acid, crotonic acid, itaconic acid, fumaric acid, maleic acid and citraconic acid, and salts thereof; various hydroxyl group-containing monomers such as 2-hydroxyethyl(meth)acrylate, 2-hydroxypropyl (meth)acrylate, 4-hydroxybutyl(meth)acrylate, monobutylhydroxyl fumarate and monobutylhydroxyl itaconate; various (meth)acrylic acid esters such as methyl(meth)acrylate, ethyl(meth)acrylate, propyl(meth)acrylate, butyl(meth)acrylate and lauryl(meth)acrylate; various nitrogen-containing vinyl-based monomers such as (meth)acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl acetate and vinyl propionate; various silicon-containing polymerizable monomers such as γ-methacryloxypropyl trimethoxysilane and vinyl trimethoxysilane; various phosphorus-containing vinyl-based monomers; various halogenated vinyl-based monomers such as vinyl chloride and vinylidene chloride; and various conjugated dienes such as butadiene.

In addition, when forming the coating layer, in order to enhance a coating appearance, a transparency and an adhesion property thereof, crosslinking agents other than the oxazoline compound, isocyanate-based compound and melamine compound may also be used in combination with these compounds.

Examples of the above crosslinking agents include an epoxy compound, a carbodiimide-based compound, a silane coupling compound, etc.

As the epoxy compound, there may be mentioned, for example, a compound having an epoxy group in a molecule thereof, and a prepolymer and a cured product of such a compound. Examples of the epoxy compound include condensation products of epichlorohydrin with a hydroxyl group of ethylene glycol, polyethylene glycol, glycerol, polyglycerol, bisphenol A, etc., or an amino group. Specific examples of the epoxy compound include polyepoxy compounds, diepoxy compounds, monoepoxy compounds and glycidyl amine compounds. Examples of the polyepoxy compounds include sorbitol polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether and trimethylolpropane polyglycidyl ether. Examples of the diepoxy compounds include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Examples of the monoepoxy compounds include allyl glycidyl ether, 2-ethylhexyl glycidyl ether and phenyl glycidyl ether. Examples of the glycidyl amine compounds include N,N,N',N'-tetraglycidyl-m-xylylenediamine and 1,3-bis(N,N-diglycidylamino)cyclohexane.

The carbodiimide-based compound is a compound having a carbodiimide structure, i.e., is in the form of a compound having one or more carbodiimide structures in a molecule thereof, and the preferred carbodiimide-based compound is a polycarbodiimide-based compound having two or more carbodiimide structures in a molecule thereof in view of a good adhesion property or the like of the resulting coating layer.

The carbodiimide-based compound may be synthesized by conventionally known techniques. In general, the carbodiimide-based compound may be obtained by a condensation reaction of a diisocyanate compound. The diisocyanate compound is not particularly limited, and may be either an aromatic diisocyanate or an aliphatic diisocyanate. Specific examples of the diisocyanate include tolylene diisocyanate, xylene diisocyanate, diphenylmethane diisocyanate, phenylene diisocyanate, naphthalene diisocyanate, hexamethylene diisocyanate, trimethyl hexamethylene diisocyanate, cyclohexane diisocyanate, methyl cyclohexane diisocyanate, isophorone diisocyanate, dicyclohexyl diisocyanate and dicyclohexylmethane diisocyanate.

Further, in order to improve a water solubility or a water dispersibility of the polycarbodiimide-based compound, a surfactant or a hydrophilic monomer such as a polyalkyleneoxide, a quaternary ammonium salt of a dialkylamino alcohol and a hydroxyalkyl sulfonic acid salt may be added thereto unless the addition thereof eliminates the effects of the present invention.

Meanwhile, these crosslinking agents are used for improving a performance of the coating layer by allowing the crosslinking agents to react with the compounds contained therein during a drying step or a film-forming step thereof. Therefore, it is estimated that the resulting coating layer comprises the unreacted crosslinking agent, compounds obtained after the reaction, or a mixture thereof.

Also, in order to improve a slipping property and an anti-blocking property of the film, particles are preferably used in combination with the aforementioned materials in the coating layer upon forming the coating layer.

The average particle diameter of the particles is usually in the range of not more than 1.0 μm, preferably not more than 0.5 μm and more preferably not more than 0.2 μm from the viewpoint of a good transparency of the resulting film.

Examples of the particles used in the coating layer include inorganic particles such as silica, alumina and metal oxides, and organic particles such as crosslinked polymer particles. In particular, from the viewpoints of a good dispersibility in the coating layer and a good transparency of the resulting coating film, silica particles are preferably used.

Further, upon forming the coating layer, there may also be used various additives such as a defoaming agent, a coatability improver, a thickening agent, an organic lubricant, an antistatic agent, an ultraviolet absorber, an antioxidant, a foaming agent, a dye and a pigment, if required, unless the subject matter of the present invention is adversely affected by the addition thereof.

The content of the (meth)acrylate (A) in the coating solution is usually in the range of 5 to 95% by weight, preferably 15 to 80% by weight and more preferably 25 to 75% by weight based on a total amount of non-volatile components in the coating solution. When the content of the (meth)acrylate (A) in the coating solution is out of the above-specified range, the resulting coating layer tends to be insufficient in adhesion property to the prism layer or microlens layer.

The content of the carbon-carbon double bond moiety of the (meth)acrylate (A) in the coating solution is usually in the range of not less than 0.5% by weight, preferably not less than 0.8% by weight and more preferably not less than 1.3% by weight based on a total amount of non-volatile components in the coating solution. When the content of the carbon-carbon double bond moiety of the (meth)acrylate (A) in the coating solution is out of the above-specified range, the resulting coating layer tends to be insufficient in adhesion property to the prism layer or microlens layer. The upper limit of the content of the carbon-carbon double bond moiety of the (meth)acrylate (A) in the coating solution is usually 30% by weight.

The content of the crosslinking agent (B) in the coating solution is usually 5 to 95% by weight, preferably 10 to 60% by weight and more preferably 20 to 50% by weight based on a total amount of whole non-volatile components in the coating solution. When the content of the crosslinking agent (B) in the coating solution is out of the above-specified range, the resulting coating layer tends to be insufficient in adhesion property to the prism layer or microlens layer.

The content of the particles in the coating solution is not specifically limited because the slipping property and anti-blocking property of the resulting film tend to vary depending upon a particle diameter of the particles and properties of the polyester film, and is usually in the range of not more than 25% by weight, preferably 3 to 15% by weight and more preferably 3 to 10% by weight. When the content of the particles in the coating solution is more than 25% by weight, the resulting coating layer tends to be deteriorated in transparency or adhesion property.

The polyester film used in the present invention may also be provided, on its surface opposed to the surface on which the above coating layer is formed, with an additional coating layer. For examples, in the case where a surface functional layer such as an anti-sticking layer, a light diffusion layer and a hard coat layer is to be formed on the surface of the polyester film which is opposed to the surface on which the prism layer or microlens layer is formed, the coating layer formed on the opposite surface of the polyester film is capable of enhancing an adhesion property to the functional layer. The coating layer formed on the opposite surface of the polyester film may comprise conventionally known components, for example, a polymer such as a polyester resin, an acrylic resin and a polyurethane resin, a crosslinking agent such as an oxazoline compound, an epoxy compound, a melamine compound, an isocyanate-based compound and a carbodiimide-based compound, etc. These components or materials may be respectively used alone or in combination of any two or more thereof. In addition, the coating layer formed on the opposite surface of the polyester film may be the above coating layer formed from the above coating solution comprising the (meth)acrylate (A) and the at least one crosslinking agent (B) selected from the group consisting of an oxazoline compound, an isocyanate-based compound and a melamine compound (i.e., the same coating layer may be formed on both side surfaces of the polyester film).

The analysis of the components contained in the coating layer may be conducted, for example, by analyzing methods such as TOF-SIMS, ESCA and fluorescent X-ray analysis.

When forming the coating layer by the in-line coating method, the coated film is preferably produced by the method in which an aqueous solution or a water dispersion comprising a series of the above mentioned compounds is prepared as a coating solution having a concentration of about 0.1 to about 50% by weight in terms of a solid content thereof, and the thus prepared coating solution is applied onto the polyester film. The coating solution may also comprise an organic solvent for the purpose of improving a dispersibility in water, a film-forming property, etc., unless the subject matter of the present invention is adversely affected by addition of the organic solvent. The organic solvents may be used alone, or may be appropriately used in the form of a mixture of any two or more thereof.

The film thickness of the coating layer is usually in the range of 0.002 to 1.0 μm, preferably 0.005 to 0.5 μm and more preferably 0.03 to 0.2 μm. When the film thickness of the coating layer is out of the above-specified range, the resulting coating layer tends to be deteriorated in adhesion property, coating appearance and anti-blocking property.

As the method of forming the coating layer, there may be used conventionally known coating methods such as a reverse gravure coating method, a direct gravure coating method, a roll coating method, a die coating method, a bar coating method and a curtain coating method.

In the present invention, the drying and curing conditions used upon forming the coating layer on the polyester film are not particularly limited. For example, in the case where the coating layer is formed by an off-line coating method, the coating layer may be subjected to heat-setting usually at a temperature of 80 to 200° C. for 3 to 40 sec and preferably at a temperature of 100 to 180° C. for 3 to 40 sec.

On the other hand, in the case where the coating layer is formed by an in-line coating method, the coating layer may be subjected to heat-setting usually at a temperature of 70 to 280° C. for 3 to 200 sec.

The polyester film constituting the coated film of the present invention may also be previously subjected to surface treatments such as corona treatment and plasma treatment.

The coating layer of the coated film according to the present invention is generally provided thereon with a prism layer or a microlens layer in order to improve a brightness of the liquid crystal display. In particular, it is possible to provide, on the coating layer, a high-refractive index resin layer required to attain the high brightness which hardly ensures a good adhesion property to the film. In recent years, in order to efficiently enhance a brightness of the liquid crystal display, there have been proposed prism layers with various shapes. In general, the prism layers have plural rows of prisms each having a triangular sectional shape which are arranged in parallel with each other. Also, there have been proposed microlens layers with various shapes. In general, the microlens layers have a structure in which a number of semispherical convex lenses are provided on a film. Both of the prism layer and the microlens layer may respectively have any conventionally known shapes.

The prism layer may have, for example, such a shape in which a thickness of the layer is 10 to 500 μm, rows of prisms have a pitch of 10 to 500 μm, and respective prisms have a triangular sectional shape having an apex angle of 40° to 100°.

The microlens layer may have, for example, such a shape in which a thickness of the layer is 10 to 500 μm, and respective lenses have a semispherical shape having a diameter of 10 to 500 μm. The shape of each lens of the microlens layer may also be a conical shape or a pyramidal shape.

As the materials of the prism layer and the microlens layer, there may be used conventionally known materials. Examples of the materials of the prism layer and the microlens layer include active energy ray-curable resins such as, typically, (meth)acrylate-based resins. Examples of the compounds constituting the above resins generally include polyhydric alcohol components such as ethylene glycol, propylene glycol, tetramethylene glycol and hexamethylene glycol, and (meth)acrylate-based compounds having a bisphenol A structure, a urethane structure, a polyester structure, an epoxy structure, etc.

The refractive index of the active energy ray-curable resin layer is preferably as high as possible because there is such a tendency that the resin layer having a higher refractive index is enhanced in brightness thereof, and is usually in the range of 1.56 to 1.65, preferably 1.57 to 1.64 and more preferably 1.58 to 1.63. When the refractive index of the active energy ray-curable resin layer is out of the above-specified range, the brightness of the resin layer tends to be hardly enhanced to a sufficient extent.

As the method for formulating the high-refractive index resin required to achieve a high brightness of the film, there may be mentioned methods in which a compound having many aromatic structures, a sulfur atom, a halogen atom and a metal compound are used in addition to the above general compounds. Among these methods, from the standpoint of a uniform refractive index of the prism layer or the microlens layer and from the environmental viewpoints, preferred are the methods using the compound having many aromatic structures or a sulfur atom.

Examples of the compound having many aromatic structures include compounds having a condensed polycyclic aromatic structure such as naphthalene, anthracene, phenanthrene, naphthacene, benzo[a]anthracene, benzo[a]phenanthrene, pyrene, benzo[c]phenanthrene and perylene; compounds having a biphenyl structure; and compounds having a fluorene structure.

Various substituent groups may be introduced into the biphenyl structure, the fluorene structure and the condensed polycyclic aromatic structure. In particular, the compounds having the above structures into which a substituent group comprising a benzene ring such as a phenyl group is introduced are preferred because they are capable of producing a layer having a higher refractive index. In addition, it is also possible to introduce an atom capable of enhancing a refractive index such as a sulfur atom and a halogen atom into the above structures. Further, in order to enhance adhesion to the coating layer, various functional groups such as an ester group, an amide group, a hydroxyl group, an amino group and an ether group may be introduced into the above structures.

EXAMPLES

The present invention is described in more detail below by Examples. However, these Examples are only illustrative and not intended to limit the present invention thereto. In addition, the measuring and evaluating methods used in the present invention are as follows.

(1) Method of Measuring Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight ratio of 50:50, and a viscosity of the resulting solution was measured at 30° C.

(2) Method of Measuring Average Particle Diameter:

Using TEM ("H-7650" manufactured by Hitachi High-Technologies Corp.; accelerated voltage: 100 V), the coating layer was observed to measure particle diameters of 10 particles therein and calculate an average particle diameter thereof from the measured ten values.

(3) Weight of Carbon-Carbon Double Bond Moiety in (meth)acrylate having Carbon-Carbon Double Bond:

The weight of a carbon-carbon double bond moiety in a (meth)acrylate having a carbon-carbon double bond was calculated from a molecular weight and a number of carbon-carbon double bonds thereof, or calculated from assignments of respective peaks observed in $^1$HNMR and $^{13}$CNMR. The NMR measurement was conducted after drying the compound under reduced pressure using NMR ("AVANCE III 600" manufactured by Bruker Biospin K.K.).

(4) Method of Measuring Film Thickness of Coating Layer:

The surface of the coating layer was dyed with $RuO_4$, and the resulting film was embedded in an epoxy resin. Thereafter, the resin-embedded film was cut into a piece by an ultrathin sectioning method, and the cut piece was dyed with $RuO_4$ to observe and measure a cut section of the coating layer using TEM ("H-7650" manufactured by Hitachi High-Technologies Corp.; accelerated voltage: 100 V). The measurement of the film thickness of the coating layer was conducted at 10 positions of the coating layer, and an average value of the thus measured 10 thickness values was defined as a thickness of the coating layer.

(5) Method for Evaluating Adhesion Property:

A composition comprising 40 parts by weight of 2-biphenoxyethyl acrylate, 10 parts by weight of 4,4'-(9-fluorenylidene) bis(2-phenoxyethyl acrylate), 37 parts by weight of ethylene glycol-modified bisphenol A acrylate (number of ethylene glycol chains: 8), 10 parts by weight of trimethylol propane triacrylate and 3 parts by weight of diphenyl(2,4,6-trimethylbenzoyl)phosphine oxide was placed in a mold for forming a prism layer in which plural rows of prism-shaped mold cavities each having an apex angle of 65° were arranged with a pitch of 50 μm in parallel with each other. Then, the coated film was overlapped on the resin in the mold such that the coating layer of the coated film came into contact with the resin. The composition was uniformly spread using a roller, and then an ultraviolet ray was irradiated thereover using an ultraviolet irradiation apparatus to cure the resin. Next, the resulting film was released from the mold to obtain a film on which the prism layer (refractive index=1.58) was formed. The prism layer of the thus obtained film was cut by a cutter knife to form flaws thereon at intervals of 5 mm. Then, a 24 mm-wide tape ("Cellotape (registered trademark) CT-24" produced by Nichiban Co., Ltd.) was attached onto the thus cut surface of the prism layer, and then rapidly peeled off therefrom at a peel angle of 180°. Then, the surface of the prism layer from which the tape was peeled off was observed to measure an area of the layer peeled off together with the tape. The evaluation ratings are as follows.

A: Peeled area of the layer was not more than 5%.

B: Peeled area of the layer was more than 5% but not more than 20%.

C: Peeled area of the layer was more than 20% but not more than 40%.

D: Peeled area of the layer was more than 40%.

The polyesters used in the respective Examples and Comparative Examples were prepared by the following methods.

<Method for Producing Polyester (A)>

One hundred parts by weight of dimethyl terephthalate and 60 parts by weight of ethylene glycol as well as ethyl acid phosphate and magnesium acetate tetrahydrate as a catalyst in amounts of 30 ppm and 100 ppm, respectively, based on the polyester as produced, were subjected to esterification reaction at 260° C. in a nitrogen atmosphere. Successively, tetrabutyl titanate in an amount of 50 ppm based on the polyester as produced was added to the reaction solution. While heating the resulting mixture to 280° C. over 2 hr and 30 min, the pressure of the reaction system was reduced to an absolute pressure of 0.3 kPa, and further the mixture was subjected to melt-polycondensation for 80 min, thereby obtaining a polyester (A) having an intrinsic viscosity of 0.63.

<Method for Producing Polyester (B)>

One hundred parts by weight of dimethyl terephthalate and 60 parts by weight of ethylene glycol as well as magnesium acetate tetrahydrate as a catalyst in an amount of 900 ppm based on the polyester as produced, were subjected to esterification reaction at 225° C. in a nitrogen atmosphere. Successively, orthophosphoric cid and germanium dioxide in amounts of 3500 ppm and 70 ppm, respectively, based on the polyester as produced, were added to the reaction solution. While heating the resulting mixture to 280° C. over 2 hr and 30 min, the pressure of the reaction system was reduced to an absolute pressure of 0.4 kPa, and further the mixture was subjected to melt-polycondensation for 85 min, thereby obtaining a polyester (B) having an intrinsic viscosity of 0.64.

<Method for Producing Polyester (C)>

The same procedure as used in the above method for producing the polyester (A) was conducted except that silica particles having an average particle diameter of 2 μm were added in an amount of 0.3 part by weight before the melt-polycondensation, thereby obtaining a polyester (C).

The compounds constituting the coating layer are as follows.

(Examples of Compounds)

(Meth)acrylate: (IA)

Tetramethylol methane ethyleneoxide-modified tetraacrylate (total number of ethylene glycol chains: 35); tetrafunctional acrylate comprising a carbon-carbon double bond moiety in an amount of 5% by weight based on a whole weight thereof.

(Meth)acrylate: (IB)

"BISCOAT #1000" (produced by Osaka Organic Chemical Industry Ltd.) in the form of a hyper-branched polymer comprising dipentaerythritol as a core which is a polyfunctional acrylate comprising a carbon-carbon double bond moiety in an amount of not less than 5% by weight based on a whole weight thereof.

Oxazoline Compound: (IIA)

Acrylic polymer having an oxazoline group and a polyalkyleneoxide chain "EPOCROSS WS-500" (produced by Nippon Shokubai Co., Ltd.; polymer of a type comprising 1-methoxy-2-propanol solvent in an amount of about 38% by weight).

Isocyanate-Based Compound: (IIB)

Aqueous blocked isocyanate-based compound comprising a blocked isocyanate comprising a hexamethylene diisocyanate trimer unit, a methoxy polyethylene glycol unit having a number-average molecular weight of 1400 and a methyl ethyl ketone oxime unit at a ratio of 30:2:68 (mol %), and a urethane resin obtained by neutralizing a prepolymer comprising a polycarbonate polyol unit having a number-average molecular weight of 2000 which was produced from 1,6-hexanediol and diethyl carbonate, an isophorone diisocyanate unit, a trimethylol propane unit and a dimethylol propionic acid unit at a ratio of 24:55:3:18 (mol %) with triethylamine and then subjecting the resulting neutralized product to chain extension reaction using diethylene triamine.

Isocyanate-Based Compound: (IIC)

Aqueous blocked polyisocyanate compound comprising a tolylene diisocyanate trimethylol propane adduct unit (tolylene diisocyanate: trimethylol propane=3:1 (mol %)), a methoxy polyethylene glycol unit having a number-average molecular weight of 2000, an N,N,N',N'-tetrakis(2-hydroxyethyl)ethylenediamine unit and a methyl ethyl ketone oxime unit at a ratio of 33:2:55:10 (mol %).

Melamine Compound: (IID)

Hexamethoxymethylol melamine

Melamine Compound: (IIE)

Crosslinked resin as an alkylol melamine/urea copolymer

Polyurethane Resin: (IIIA)

Water dispersion of a polyester-based polyurethane resin comprising a tolylene diisocyanate unit, a terephthalic acid unit, an isophthalic acid unit, an ethylene glycol unit, a neopentyl glycol unit and a dimethylol propionic acid unit at a ratio of 14:17:17:23:24:5 (mol %).

Polyurethane Resin: (IIIB)

Water dispersion of a polycarbonate polyurethane resin comprising a polycarbonate polyol unit having a number-average molecular weight of 2000 which was produced from 1,6-hexanediol and diethyl carbonate, a methylene-bis(4-cyclohexyl isocyanate) unit and a dimethylol propionic acid unit at a ratio of 45:50:5 (mol %).

Acrylic Resin: (IIIC)

Water dispersion of an acrylic resin comprising an ethyl acrylate unit, an n-butyl acrylate unit, a methyl methacrylate unit, an N-methylol acrylamide unit, an acrylic acid unit at a ratio of 67:17:10:2:4 (mol %) (emulsifier: anionic surfactant).

Polyester Resin: (IIID)

Water dispersion of a polyester resin produced from terephthalic acid:isophthalic acid:5-sodium sulfoisophthalic acid:ethylene glycol:1,4-butanediol:diethylene glycol=56:40:4:70:20:10 (mol %).

Epoxy Compound: (IV)

Polyglycerol polyglycidyl ether "DECONAL EX-521" (produced by Nagase Chemtex Co., Ltd.)

Particles: (V)

Silica sol having an average particle diameter of 0.07 μm

Example 1

A mixed raw material obtained by mixing the polyesters (A), (B) and (C) in amounts of 89% by weight, 5% by weight and 6% by weight, respectively, as a raw material for outermost layers (surface layers), and a mixed raw material obtained by mixing the polyesters (A) and (B) in amounts of 95% by weight and 5% by weight, respectively, as a raw material for an intermediate layer, were respectively charged into two extruders, melted therein at 285° C., and then co-extruded therefrom on a chilled roll whose surface was controlled to a temperature of 40° C. into a two-kind/three-layer structure (surface layer/intermediate layer/surface layer=1:18:1 as output), followed by cooling and solidifying the thus extruded sheet on the chilled roll, thereby obtaining an undrawn sheet.

Next, the thus obtained undrawn sheet was drawn utilizing a difference between peripheral speeds of rolls at 85° C. at a draw ratio of 3.4 times in a longitudinal direction thereof. Thereafter, a coating solution 1 shown in the below-mentioned Table 1 was applied on both surfaces of the thus obtained longitudinally drawn sheet. Then, the resulting coated sheet was introduced into a tenter where the sheet was drawn at 120° C. at a draw ratio of 4.0 times in a lateral direction thereof and then heat-set at 225° C. Thereafter, the obtained drawn sheet was relaxed by 2% in a lateral direction thereof, thereby obtaining a polyester film having a thickness of 125 μm which was provided on both surfaces thereof with a coating layer having a thickness of 0.13 μm (after dried). As a result of evaluating the thus obtained polyester film, it was confirmed that the film exhibited a good adhesion property to a prism layer. The properties of the film are shown in Table 3 below.

Examples 2 to 28

The same procedure as in Example 1 was conducted except that the coating agent composition was changed to those shown in Tables 1 and 2, thereby obtaining polyester films. As a result of evaluating the thus obtained coated films, it was confirmed that properties of the coated films were as shown in Table 3, i.e., the coated films exhibited a good adhesion property.

Comparative Examples 1 and 14

The same procedure as in Example 1 was conducted except that the coating agent composition was changed to those shown in Table 2, thereby obtaining polyester films. As a result of evaluating the thus obtained coated films, it was confirmed that properties of the coated films were as shown in Table 4, i.e., the coated films exhibited a poor adhesion property.

TABLE 1

| Coating solutions | Coating agent composition (wt %) |  |  |  |  |  |  |
|---|---|---|---|---|---|---|---|
|  | IA | IB | IIA | IIB | IIC | IID | IIE |
| 1 | 60 | 0 | 37 | 0 | 0 | 0 | 0 |
| 2 | 70 | 0 | 27 | 0 | 0 | 0 | 0 |
| 3 | 80 | 0 | 17 | 0 | 0 | 0 | 0 |
| 4 | 0 | 60 | 37 | 0 | 0 | 0 | 0 |
| 5 | 20 | 0 | 10 | 0 | 0 | 0 | 0 |
| 6 | 20 | 0 | 10 | 0 | 0 | 0 | 0 |
| 7 | 20 | 0 | 10 | 0 | 0 | 0 | 0 |
| 8 | 60 | 0 | 0 | 37 | 0 | 0 | 0 |
| 9 | 40 | 0 | 0 | 57 | 0 | 0 | 0 |
| 10 | 20 | 0 | 0 | 77 | 0 | 0 | 0 |
| 11 | 80 | 0 | 0 | 17 | 0 | 0 | 0 |
| 12 | 60 | 0 | 0 | 0 | 37 | 0 | 0 |
| 13 | 0 | 60 | 0 | 37 | 0 | 0 | 0 |
| 14 | 20 | 0 | 0 | 10 | 0 | 0 | 0 |
| 15 | 20 | 0 | 0 | 10 | 0 | 0 | 0 |
| 16 | 20 | 0 | 0 | 10 | 0 | 0 | 0 |
| 17 | 50 | 0 | 0 | 0 | 0 | 47 | 0 |
| 18 | 45 | 0 | 0 | 0 | 0 | 52 | 0 |
| 19 | 60 | 0 | 0 | 0 | 0 | 37 | 0 |
| 20 | 0 | 50 | 0 | 0 | 0 | 47 | 0 |

| Coating solutions | Coating agent composition (wt %) |  |  |  |  |  |
|---|---|---|---|---|---|---|
|  | IIIA | IIIB | IIIC | IIID | IV | V |
| 1 | 0 | 0 | 0 | 0 | 0 | 3 |
| 2 | 0 | 0 | 0 | 0 | 0 | 3 |
| 3 | 0 | 0 | 0 | 0 | 0 | 3 |
| 4 | 0 | 0 | 0 | 0 | 0 | 3 |
| 5 | 67 | 0 | 0 | 0 | 0 | 3 |
| 6 | 0 | 67 | 0 | 0 | 0 | 3 |
| 7 | 0 | 0 | 67 | 0 | 0 | 3 |
| 8 | 0 | 0 | 0 | 0 | 0 | 3 |
| 9 | 0 | 0 | 0 | 0 | 0 | 3 |
| 10 | 0 | 0 | 0 | 0 | 0 | 3 |
| 11 | 0 | 0 | 0 | 0 | 0 | 3 |
| 12 | 0 | 0 | 0 | 0 | 0 | 3 |
| 13 | 0 | 0 | 0 | 0 | 0 | 3 |
| 14 | 67 | 0 | 0 | 0 | 0 | 3 |
| 15 | 0 | 0 | 67 | 0 | 0 | 3 |
| 16 | 0 | 0 | 0 | 67 | 0 | 3 |
| 17 | 0 | 0 | 0 | 0 | 0 | 3 |
| 18 | 0 | 0 | 0 | 0 | 0 | 3 |
| 19 | 0 | 0 | 0 | 0 | 0 | 3 |
| 20 | 0 | 0 | 0 | 0 | 0 | 3 |

TABLE 2

| Coating solutions | Coating agent composition (wt %) |  |  |  |  |  |  |
|---|---|---|---|---|---|---|---|
|  | IA | IB | IIA | IIB | IIC | IID | IIE |
| 21 | 50 | 0 | 0 | 0 | 0 | 0 | 47 |
| 22 | 40 | 0 | 0 | 0 | 0 | 37 | 0 |
| 23 | 40 | 0 | 0 | 0 | 0 | 37 | 0 |
| 24 | 40 | 0 | 0 | 0 | 0 | 37 | 0 |
| 25 | 50 | 0 | 0 | 0 | 0 | 37 | 0 |
| 26 | 97 | 0 | 0 | 0 | 0 | 0 | 0 |
| 27 | 0 | 0 | 97 | 0 | 0 | 0 | 0 |
| 28 | 60 | 0 | 0 | 0 | 0 | 0 | 0 |
| 29 | 0 | 0 | 0 | 0 | 0 | 0 | 0 |
| 30 | 0 | 0 | 0 | 0 | 0 | 0 | 0 |
| 31 | 0 | 0 | 0 | 0 | 97 | 0 | 0 |
| 32 | 0 | 0 | 0 | 37 | 0 | 0 | 0 |
| 33 | 0 | 0 | 0 | 37 | 0 | 0 | 0 |
| 34 | 0 | 0 | 0 | 37 | 0 | 0 | 0 |
| 35 | 0 | 0 | 0 | 0 | 0 | 97 | 0 |
| 36 | 50 | 0 | 0 | 0 | 0 | 0 | 0 |
| 37 | 0 | 0 | 0 | 0 | 0 | 47 | 0 |
| 38 | 0 | 0 | 0 | 0 | 0 | 47 | 0 |
| 39 | 0 | 0 | 0 | 0 | 0 | 47 | 0 |

| Coating solutions | Coating agent composition (wt %) |  |  |  |  |  |
|---|---|---|---|---|---|---|
|  | IIIA | IIIB | IIIC | IIID | IV | V |
| 21 | 0 | 0 | 0 | 0 | 0 | 3 |
| 22 | 20 | 0 | 0 | 0 | 0 | 3 |
| 23 | 0 | 0 | 20 | 0 | 0 | 3 |
| 24 | 0 | 0 | 0 | 20 | 0 | 3 |
| 25 | 0 | 0 | 0 | 0 | 10 | 3 |
| 26 | 0 | 0 | 0 | 0 | 0 | 3 |

TABLE 2-continued

| | | | | | | |
|---|---|---|---|---|---|---|
| 27 | 0 | 0 | 0 | 0 | 0 | 3 |
| 28 | 0 | 0 | 0 | 0 | 37 | 3 |
| 29 | 0 | 0 | 97 | 0 | 0 | 3 |
| 30 | 97 | 0 | 0 | 0 | 0 | 3 |
| 31 | 0 | 0 | 0 | 0 | 0 | 3 |
| 32 | 60 | 0 | 0 | 0 | 0 | 3 |
| 33 | 0 | 0 | 60 | 0 | 0 | 3 |
| 34 | 0 | 0 | 0 | 60 | 0 | 3 |
| 35 | 0 | 0 | 0 | 0 | 0 | 3 |
| 36 | 0 | 0 | 0 | 0 | 47 | 3 |
| 37 | 50 | 0 | 0 | 0 | 0 | 3 |
| 38 | 0 | 0 | 50 | 0 | 0 | 3 |
| 39 | 0 | 0 | 0 | 50 | 0 | 3 |

TABLE 3

| Examples | Coating solution | Thickness (μm) | Adhesion property |
|---|---|---|---|
| Example 1 | 1 | 0.13 | A |
| Example 2 | 2 | 0.13 | A |
| Example 3 | 3 | 0.13 | B |
| Example 4 | 4 | 0.13 | A |
| Example 5 | 5 | 0.13 | B |
| Example 6 | 6 | 0.13 | A |
| Example 7 | 7 | 0.13 | A |
| Example 8 | 8 | 0.02 | B |
| Example 9 | 8 | 0.05 | A |
| Example 10 | 8 | 0.13 | A |
| Example 11 | 9 | 0.13 | A |
| Example 12 | 10 | 0.13 | A |
| Example 13 | 11 | 0.13 | B |
| Example 14 | 12 | 0.13 | A |
| Example 15 | 13 | 0.13 | A |
| Example 16 | 14 | 0.13 | A |
| Example 17 | 15 | 0.13 | A |
| Example 18 | 16 | 0.13 | A |
| Example 19 | 17 | 0.13 | A |
| Example 20 | 17 | 0.15 | A |
| Example 21 | 18 | 0.15 | B |
| Example 22 | 19 | 0.15 | B |
| Example 23 | 20 | 0.15 | A |
| Example 24 | 21 | 0.15 | A |
| Example 25 | 22 | 0.15 | A |
| Example 26 | 23 | 0.15 | A |
| Example 27 | 24 | 0.15 | A |
| Example 28 | 25 | 0.15 | A |

TABLE 4

| Comparative Examples | Coating solution | Thickness (μm) | Adhesion property |
|---|---|---|---|
| Comp. Example 1 | 26 | 0.13 | D |
| Comp. Example 2 | 27 | 0.13 | D |
| Comp. Example 3 | 28 | 0.13 | D |
| Comp. Example 4 | 29 | 0.13 | D |
| Comp. Example 5 | 30 | 0.13 | D |
| Comp. Example 6 | 31 | 0.05 | D |
| Comp. Example 7 | 32 | 0.05 | D |
| Comp. Example 8 | 33 | 0.05 | D |
| Comp. Example 9 | 34 | 0.05 | D |
| Comp. Example 10 | 35 | 0.15 | D |
| Comp. Example 11 | 36 | 0.15 | D |
| Comp. Example 12 | 37 | 0.15 | D |
| Comp. Example 13 | 38 | 0.15 | D |
| Comp. Example 14 | 39 | 0.15 | D |

INDUSTRIAL APPLICABILITY

The coated film of the present invention can be suitably used in the applications in which a good adhesion property to a surface functional layer such as a prism layer or a microlens layer, etc., is required, such as, for example, in a backlight unit for liquid crystal displays, etc.

The invention claimed is:

1. A coated film comprising:
   a polyester film;
   a coating layer having a thickness of 0.002 to 0.2 μm and formed on at least one surface of the polyester film which is prepared from a coating solution comprising a (meth)acrylate (A) and at least one crosslinking agent (B) selected from the group consisting of an oxazoline compound, an isocyanate-based compound and a melamine compound; and
   a surface functional layer which is formed from a solvent-free active energy ray-curable resin on a surface of the coating layer and has a refractive index of 1.56 to 1.65.

2. The coated film according to claim 1, wherein a content of a carbon-carbon double bond in the (meth)acrylate (A) is not less than 3% by weight.

3. The coated film according to claim 1, wherein the (meth)acrylate (A) is a polyfunctional (meth)acrylate.

4. The coated film according to claim 1, wherein a content of the (meth)acrylate (A) in the coating solution is 5 to 95% by weight, and a content of the crosslinking agent (B) in the coating solution is 5 to 95% by weight, both based on a total amount of whole non-volatile components in the coating solution.

5. The coated film according to claim 1, wherein the coating solution further comprises particles having an average particle diameter of not more than 1.0 μm, and a content of the particles in the coating solution is not more than 25% by weight based on a total amount of whole non-volatile components in the coating solution.

6. The coated film according to claim 1, wherein the isocyanate-based compound is selected from the group consisting only of tolylene diisocyanate, xylylene diisocyanate, methylene diphenyl diisocyanate, phenylene diisocyanate, naphthalene diisocyanate, α,α,α',α'-tetramethyl xylylene diisocyanate, methylene diisocyanate, propylene diisocyanate, lysine diisocyanate, trimethyl hexamethylene diisocyanate, hexamethylene diisocyanate, cyclohexane diisocyanate, methyl cyclohexane diisocyanate, isophorone diisocyanate, methylene-bis(4-cyclohexyl isocyanate), isopropylidene dicyclohexyl diisocyanate, biuret compounds, isocyanurate compounds, uretdione compounds, carbodiimide-modified compounds of isocyanates, blocked isocyanates, and combinations thereof.

7. The coated film according to claim 6, wherein blocking agents used in the production of the blocked isocyanates are selected from the group consisting only of bisulfites; phenol, cresol, ethyl phenol, propylene glycol monomethyl ether, ethylene glycol, benzyl alcohol, methanol, ethanol, dimethyl malonate, diethyl malonate, methyl acetoacetate, ethyl acetoacetate, acetyl acetone, butyl mercaptan, dodecyl mercaptan, ε-caprolactam and δ-valerolactam, diphenyl aniline, aniline and ethylene imine, acetanilide, acetic acid amide, formaldehyde, acetaldoxime, acetone oxime, methyl ethyl ketone oxime, cyclohexanone oxime, and combinations thereof.

8. A coated film comprising:
   a polyester film, and
   a coating layer having a thickness of 0.002 to 0.2 μm and formed on at least one surface of the polyester film which is prepared from a coating solution comprising a (meth)acrylate (A) and at least one crosslinking agent (B) selected from the group consisting of an oxazoline compound, an isocyanate-based compound and a melamine compound, wherein non-volatile components in the coating solution consist only of a (meth)acrylate (A) and at least one crosslinking agent (B) selected from the group consisting of an oxazoline compound, an isocyanate-based compound and a melamine compound.

* * * * *